United States Patent
Blechschmidt

[19]

[11] Patent Number: 5,927,010
[45] Date of Patent: Jul. 27, 1999

[54] AIR-DRIVEN ROTATING WINDOW

[76] Inventor: Wolfgang J. Blechschmidt, 16421 NE. 18th St., Bellevue, Wash. 98008

[21] Appl. No.: 08/829,326

[22] Filed: Apr. 2, 1997

[51] Int. Cl.$^6$ .................................................. E05F 15/20
[52] U.S. Cl. ............................................ 49/21; 359/508
[58] Field of Search ............................ 49/21, 324, 354; 359/508

[56] References Cited

U.S. PATENT DOCUMENTS

| | | |
|---|---|---|
| 1,319,516 | 10/1919 | Drew . |
| 1,340,025 | 5/1920 | Normanville et al. . |
| 3,103,712 | 9/1963 | Allinikov et al. .................. 350/319 X |
| 3,347,004 | 10/1967 | Allen . |
| 3,495,366 | 2/1970 | Allen . |
| 3,688,081 | 8/1972 | Speich ..................................... 219/203 |
| 4,536,064 | 8/1985 | Schindel et al. ........................ 350/583 |
| 5,161,055 | 11/1992 | Blechschmidt .......................... 359/508 |

FOREIGN PATENT DOCUMENTS

| | | |
|---|---|---|
| 870794 | 3/1942 | France . |
| 1160891 | 8/1958 | France . |
| 555769 | 5/1958 | Italy . |
| 1001878 | 10/1961 | United Kingdom . |
| 900916 | 7/1962 | United Kingdom . |

*Primary Examiner*—Jerry Redman
*Attorney, Agent, or Firm*—Seed and Berry LLP

[57] ABSTRACT

An air-driven rotating window assembly mountable to one side of a viewing window. The rotating window assembly faces toward the working or weather exposed area and slings off, by centrifugal force, any debris that contacts the rotating window so as to maintain clear visibility through a portion of the viewing window over which the rotating window extends. The rotating window assembly includes a support base and a rotating window rotatably mounted to the support base. The rotating window has an annular frame with propulsion passages therein that receive a flow of pressurized gas substantially tangentially to the frame. The propulsion passages redirect the gas to generate a propulsive force on the frame to spin the rotating window relative to the support base. The gas exits the annular frame through a restricted gap between the support base and the rotating window so as to form an air barrier that prevents debris from passing through the gap.

28 Claims, 5 Drawing Sheets

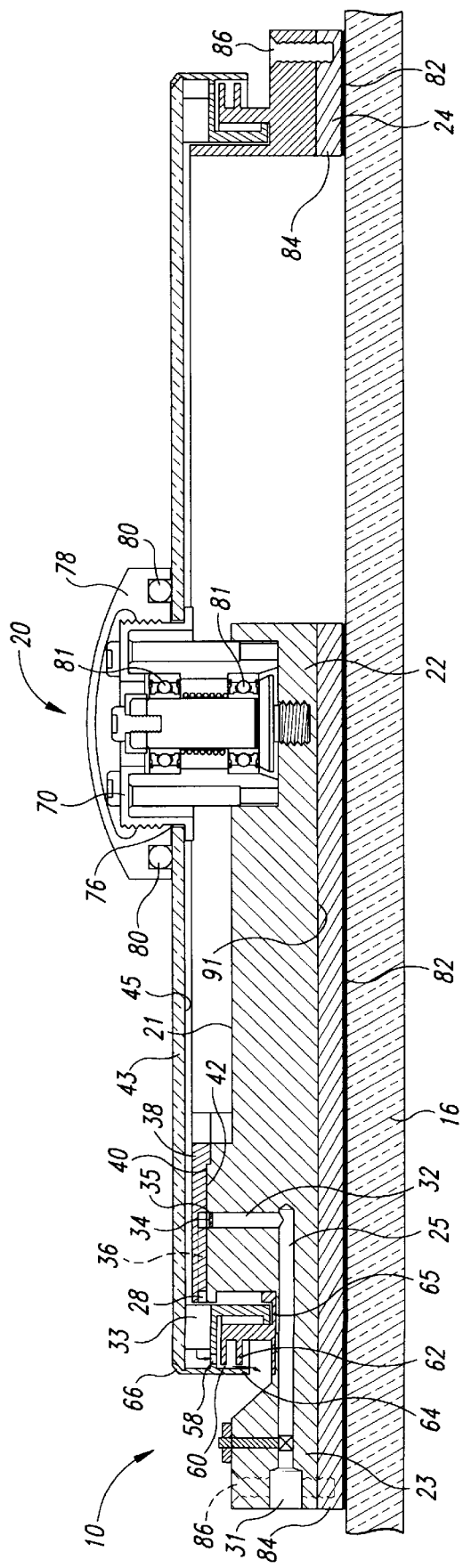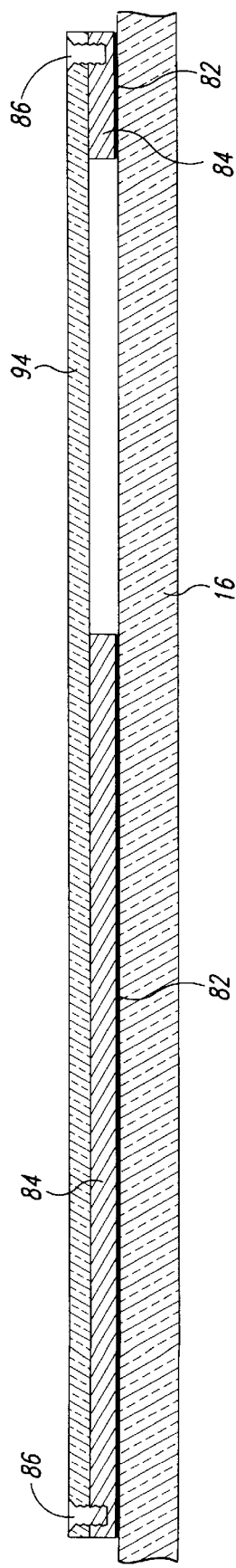
Fig. 5A
Fig. 5B

AIR-DRIVEN ROTATING WINDOW

TECHNICAL FIELD

The present invention is directed toward vision improvement devices, and more specifically, to rotating devices for maintaining clear visibility through viewing windows.

BACKGROUND OF THE INVENTION

The need for maintaining clear visibility through viewing windows has long been recognized, particularly in the shipping industry, the tooling and machining industry, the land vehicle industry and in many other areas where clear visibility through a window is required.

Visibility through a viewing window is commonly impeded when, for example, water and other debris impact the window. In the machining and tooling industry, there is a need to maintain the window through which the work piece is viewed clear of liquid machining lubricant, metal chips, and debris generated during the machining process. However, the windows tend to impede, rather than improve, visibility because the chips scratch the window. Furthermore, the lubricants or other liquids obscure visibility through the window because of their formulation to increase the "wetting" action, which results in substantially coating the window.

In the and shipping and land vehicle industries, reciprocating wipers have been used to remove water and debris from windows, such as windshields. Windshield wipers do not reciprocate fast enough to maintain a clear view through the window, particularly a ship's window, so as to overcome the problem of water collecting on the window.

Rotating windows have been used to overcome some of the above-noted problems, particularly in the machining and shipping industries. A rotating window places a centrifugal force on any object that comes into contact with the window and slings the object immediately off the rotating window.

Conventional rotating windows are driven by electric motors. Electrically driven rotating windows suffer from several drawbacks. In the high moisture environments in which rotating windows are typically used, components such as motor poles may corrode, causing the motor to fail and requiring that the motor be replaced. If the motor fails while in use, the motor or the entire rotating window must be replaced. If the rotating window is on a machining assembly, the machine assembly typically is taken out of service for a period of time until replacement is completed.

Air-driven windows have been used to overcome some of the above-mentioned problems. Existing air-driven windows are driven in the manner of an anemometer by directing air toward shallow cups or other features that catch the air to spin the window. Existing air-driven windows, however, have several shortcomings. One problem is that air passing into and out of the shallow grooves creates substantial noise, which may interfere with a user's ability to concentrate on the task at hand, such as piloting a vehicle or completing a machining operation.

A further problem with conventional air-driven windows is that they are not efficient. Air may reflect from various surfaces of the grooves so as to impede the flow of air entering and exiting the grooves, reducing the overall propulsive force of the air on the rotating window. Once the air has passed out of the grooves, the air remains trapped in the region between the rotating window and a stationary window to which the rotating window is attached. The trapped air creates friction with the rotating window, reducing the rotational speed and effectiveness of the window.

SUMMARY OF THE INVENTION

The present invention is directed toward a rotating viewing assembly driven by gas, such as air. In an exemplary embodiment, the window comprises a support base having a gas supply passageway which has an inlet aperture at one end and an outlet aperture at an opposite end. The inlet aperture is coupleable to a gas source such as an air compressor. The outlet aperture is sized to direct a flow of air in a selected direction away from the outlet aperture. A rotating window is rotatably mounted to the support base with a centrally mounted hub. The rotating window has an outer edge portion which is positioned radially outward from the hub. The outer edge portion contains a plurality of propulsion passages, each having a gas intake aperture which receives air from the outlet aperture of the gas supply passageway. The air passes from the intake aperture, through the propulsion passages, and out an exit region which redirects the air in a second direction away from the outer edge portion. This redirecting of the air by the propulsion passages generates a propulsion force on the rotating window's outer edge portion, thereby spinning the rotating window. As the rotating window spins, it centrifugally slings off any debris contacting the rotating window.

In the exemplary embodiment, the propulsion passages are defined by a plurality of spaced apart buckets formed in the outer edge portion of the rotating window, with each propulsion passage being formed by the space between two buckets. The exit region of each propulsion passage is preferably positioned radially outward from the gas intake region and is shaped to direct the air into a circumferential gap formed between the rotating window and the support base. The air passes through the circumferential gap and away from the rotating window so as to minimize any friction forces generated by the air on the rotating window. The exiting air also prevents debris from entering the circumferential gap.

In a further exemplary embodiment, the support base of the rotating window is removably attached to a mounting plate which is fixedly attached to one side of a stationary viewing window. When the rotating window is not in use, the support base and rotating window may be removed as a single unit from the mounting plate. A cover is provided and is removably attached to the mounting plate in place of the rotating window and support base to temporarily cover and protect the mounting plate and the viewing window to which the mounting plate is mounted.

These and other aspects of this invention will become evident upon reference to the following detailed description and attached drawings.

BRIEF DESCRIPTION OF THE DRAWINGS

FIG. 5A is a cross-sectional view of an alternate embodiment of a rotating viewing assembly with a rotating viewing assembly being shown removably attached to a mounting plate.

FIG. 5B is a cross-sectional view of the mounting plate of FIG. 5A with a removable cover installed in place of the rotating viewing assembly.

DETAILED DESCRIPTION OF THE INVENTION

The present invention is directed toward a gas-driven rotatable viewing assembly for maintaining clear visibility through a portion of a stationary window to which the assembly is attached. The assembly is driven in an efficient manner by air or another gas, which at the same time substantially prevents debris from contaminating the assembly.

Figure 1:
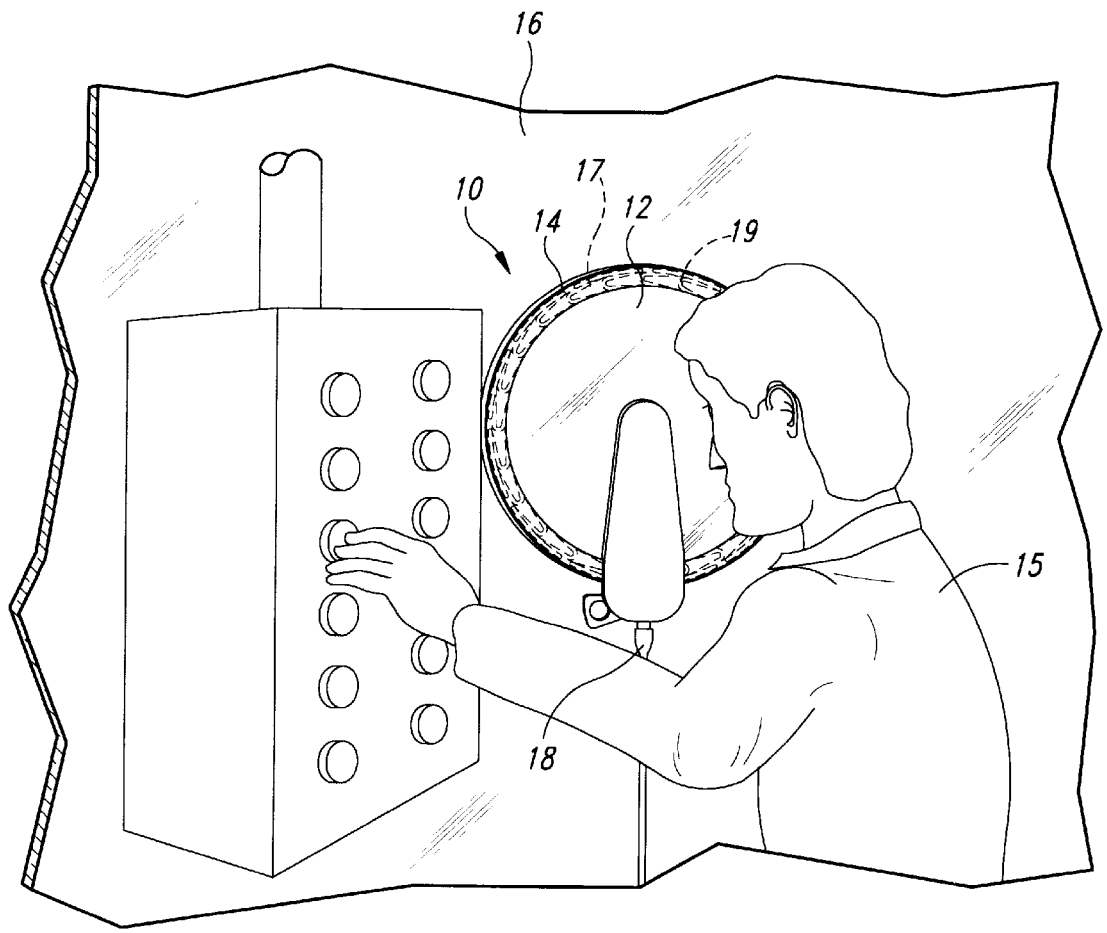
FIG. 1 is a rear isometric view showing a rotating viewing assembly in accordance with an embodiment of the present invention, the viewing assembly being shown mounted to a viewing window through which a user is looking.

A rotating viewing assembly 10 in accordance with an exemplary embodiment of the present invention is shown in the drawings for purposes of illustration. As is best seen in FIG. 1, the rotating viewing assembly 10 includes a support base 14 is fixed to a stationary window 16 on an inside surface facing away from a user 17, so the window is between the rotating viewing assembly 10 and the user.

The support base 14 rotatably supports an air-driven viewing screen or rotating window 12 that spins relative to the support base 14. The rotating window 12 includes a plurality of propulsion passages 19 formed in an annular frame 17 that defines the rotating window's outer periphery are adapted to receive compressed air or other gas that passes from a supply hose 18 through a portion of the support base. The propulsion passages 19 are shaped and sized such that the compressed air moving through the propulsion passages causes the rotating window 12 to spin relative to the support base 14 at a high rate of speed. Any objects contacting the spinning rotating window are slung off the screen by centrifugal force. Accordingly, the user 15 shown in FIG. 1, looking through the stationary window 16 and the rotating window 12 while operating a control panel, has a clear and unobstructed view through the rotating viewing assembly 10.

Figure 2:
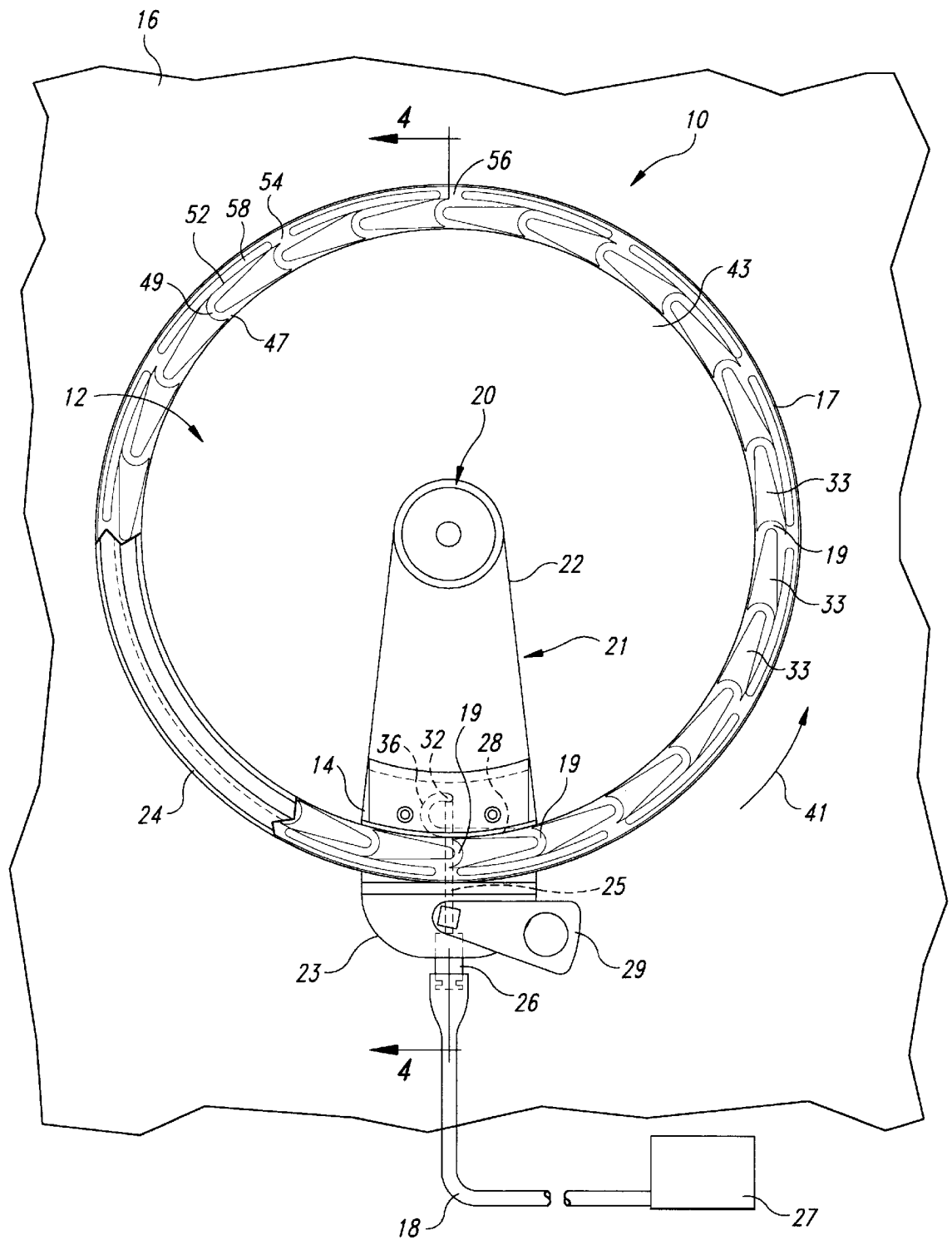
FIG. 2 is an enlarged front elevational view of the rotating assembly of FIG. 1 with a rotating window partially cut away to show a support base.

As best seen in FIG. 2, the support base 14 includes an annular base ring 24 and a base-center portion 21, each of which are adhered or otherwise fixed to the window 16. The base-center portion 21 has an outer portion 23 connected to the base ring 24, and the base-center portion extends radially inwardly to a hub housing portion 22. The hub housing portion 22 retains a hub assembly 20 that connects the base-center portion 21 to a center portion of the rotating window 12 while permitting the rotating window to spin relative to the support base 14.

The outer portion 23 of the base-center portion 21 includes an air supply passageway 25 that directs air from the supply hose 18 to the rotating window 12 to spin the rotating window. The air supply passageway 25 has a hose connector 26 at a radially outward end and an air outlet aperture 28 at the radially inward end. The hose connector 26 connects to the supply hose 18, which is in turn connected to a compressor 27, shown schematically in FIG. 2, that provides compressed air. Although this exemplary embodiment uses compressed air, such as is commonly available in machine shop environments, alternate embodiments use other compressed gases to drive the rotating window 12.

A control valve 29 regulates the flow of air from the compressor 27 through the hose 18 and into the air supply passageway 25. When the control valve 29 is open, air is permitted to pass into the air supply passageway 25 and out through the outlet aperture 28. The control valve 29 can be used to modify the characteristics of the airflow to the rotating window 12 so as to control the rotational speed and torque of the rotating window.

The outlet aperture 28 is positioned to direct the air from the air supply passageway 25 into the rotating window's propulsion passages 19 as the rotating window spins and each propulsion passage moves past the outlet aperture. As the air passes through each propulsion passage 19, it drives the rotating window 12 in a counter-clockwise direction indicated by arrow 41, as discussed in greater detail below.

Figure 3:
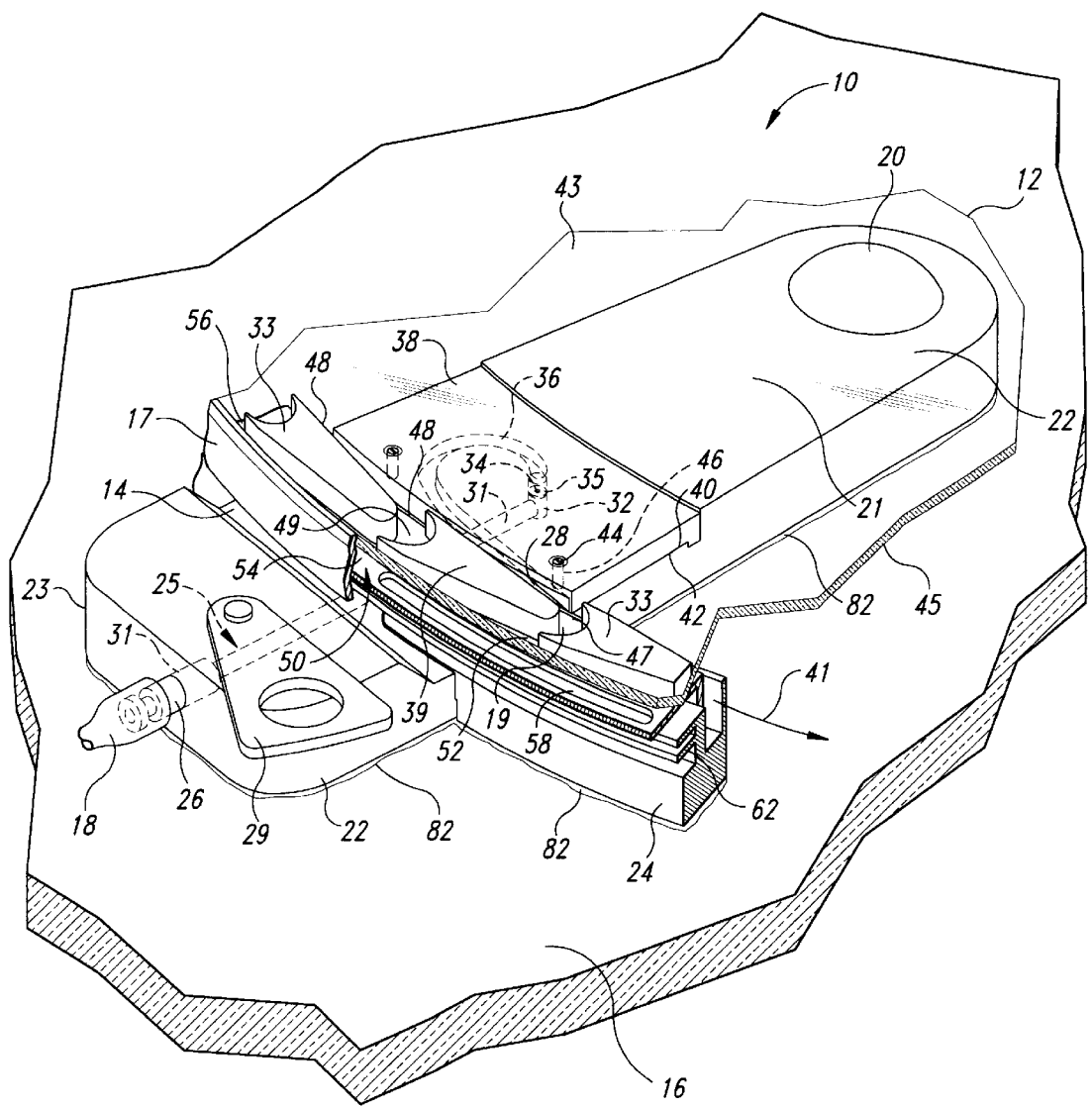
FIG. 3 is an enlarged partial isometric view of the assembly of FIG. 1.

Details of the air supply passageway 25 and the propulsion passages 19 are shown in FIG. 3. The air supply passageway 25 includes a radial portion 31 that extends radially inward through the base-center portion 21 from the hose connector 26 toward the hub housing portion 22. The radial portion 31 is connected to an axial portion 32 at a position radially inward of the base ring 24 and the rotating window's annular frame 17. The axial portion extends axially toward the rotating window 12. Accordingly, the air supply passageway 25 has a 90° bend between the radial and axial portions 31 and 32.

The axial portion 32 preferably contains a throttling orifice 34 which throttles the flow of gas passing therethrough to a working pressure. In one embodiment, the throttling orifice 34 is a fixed orifice of a selected size. In an alternate embodiment, the throttling orifice 34 is housed in a ring 35 which may easily be removed from the axial portion 32 for maintenance or replacement. For example, the ring 35 can be replaced with a ring having a throttling orifice 34 of a different size so as to adjust the pressure of the gas flowing through the air supply passageway 25. Accordingly, the throttling orifice 34 can be modified to change the characteristics of the airflow to the rotating window 12 so as to control the rotational speed and torque of the rotating window.

Such modification to the airflow results in a substantially linear relationship to the torque of the rotating window 12. As an example, if the airflow to the rotating window 12 is doubled, the torque is doubled. Therefore, the torque of the rotating window 12 is easily controlled or established by selectively controlling the airflow to the rotating window.

The axial portion 32 of air supply passageway 25 is connected at one end to a curved nozzle portion 36. The curved nozzle portion 36 is downstream of the throttling orifice 34 and connects to the outlet aperture 28, which directs the air into the propulsion passages 19. The curved shape of the nozzle portion 36 redirects the air, which flows axially through the axial portion 32, to flow in a direction more closely aligned with the travel direction 41 of the annular frame 17.

As best seen in FIG. 3, the nozzle portion 36 of the exemplary embodiment is formed in a nozzle plate 38 that is connected to the base-center portion 21 adjacent to the rotating window's annular frame 17. In a preferred aspect of this embodiment, the nozzle portion 36 is formed by a groove machined into an undersurface 40 of the nozzle plate 38. The nozzle plate 38 is attached to the base-center portion 21 such that the undersurface 40 forms a gas-tight seal with a corresponding mounting surface 42 of the base-center portion. Accordingly, nozzle portion 36 is thus defined by walls of the groove and by the mounting surface 42.

The nozzle plate 38 is removably attached to the base-center portion 21 with mounting screws 44 that are threaded into holes 46 in the base-center portion. In alternate embodiments, other means are used to removably secure the nozzle plate 38 to the base-center portion 21. The removable nozzle plate 38 allows easy access to the ring 35 containing the throttling orifice 34 so as to clean the orifice or replace the ring. The removable nozzle plate 38 is also easily replaced with another nozzle plate having a nozzle portion 36 and the outlet aperture 28 with different shapes or sizes. Accordingly, characteristics of the air flow to the propulsion passages 19 are easily modified by replacing the nozzle plate 38.

In the exemplary embodiment, the nozzle channel 36 and the outlet aperture 28 are shaped to direct the air in a selected direction toward propulsion passages 19 as the passages move past the outlet aperture. The nozzle channel 36 and outlet aperture 28 are configured to direct the air passing therethrough at an acute angle, and more preferably, substantially tangential to the rotating window's annular frame 17 for a smooth transition into the propulsion passages 19. In this way, the air flow entering the propulsion passages 19 is closely aligned with the travel direction 41 of the annular frame 17 so that the air imparts momentum to the rotating window 12 primarily in the travel direction, thereby maximizing the rotating window's rotational speed.

In alternate embodiments, not shown, airflow is provided to the propulsion passages 19 by two, three, or more outlet apertures 28, and each of the outlet apertures align with separate propulsion passages 19. The additional outlet apertures 28 can be formed by providing two, three, or more nozzle channels 36 in a single nozzle plate 38. Alternatively, separate nozzle plates 38 could be used, with each nozzle plate being coupled to a separate air supply passageway 25. The additional outlet apertures 28 allow for an increased volume of airflow provided to the rotating window, thereby increasing the torque of the window in accordance with the linear relationship discussed above.

As best seen in FIG. 3, the rotating window 12 includes the annular frame 17 that has a shape corresponding to the shape of the support base's base ring 24. The annular frame 17 has a support surface 39 that faces away from the base ring 24. The annular frame 12 supports a transparent or substantially transparent pane 43 on the support surface 39. The pane 43 extends across the annular frame 17 parallel to the stationary window 16 and connects to the hub assembly 20, which is connected to the base-center portion 21. Accordingly, the pane 43 and the annular frame 17 spin relative to the support base 14 about an axis extending through the hub assembly 20.

The propulsion passages 19 are arcuate passages defined by spaces between a plurality of buckets 33, also known as vanes, that are positioned around the annular frame 17, such that the buckets define the upper surface 39 of the annular frame. The buckets 33 are preferably machined directly into the annular frame 17 so as to minimize the potential for gas leaks between the buckets and the annular frame. When the pane 43 is in place, a lower surface 45 of the pane is sealably adhered to the annular frame's upper surface 39 and extends over each of the propulsion passages 19, such that the pane define one wall of each propulsion passage.

The illustrated embodiment has the buckets 33 and the propulsion passages 19 positioned substantially in one plane. In an alternate embodiment, the annular frame 17 has a plurality of buckets 33 in our plane and a plurality of buckets is a second plane, such that the buckets and propulsion passages therebetween are stacked in different planes. As an example, buckets 33 could be formed on opposite sides of the annular frame. This alternate embodiment also has one or more outlet apertures 28 that directs air or other gas to each set of propulsion passages 19 defined by each set of buckets. This stacked bucket and propulsion passage configuration provides increased torque to the rotating window 12 in accordance with the linear relationship discussed above.

Each propulsion passage 19 includes an air intake aperture 47 that defines an air entrance portion 48 positioned to align with the outlet aperture 28 and to receive air as the respective propulsion passage moves past the outlet aperture. In the exemplary embodiment, the entrance portion 48 is generally straight and extends substantially tangential to the annular frame 17 to ensure that the air entering the propulsion passageway 30 is substantially aligned with the travel direction 41 of the annular frame. Each propulsion passage 19 further includes an arcuate intermediate portion 49 extending radially outwardly from the entrance portion 48.

The intermediate portion 49 preferably has a generally semi-circular shape that redirects the air passing therethrough by approximately 180°. Accordingly, the air exiting the intermediate portion 49 exits the propulsion passages 19 substantially tangential to the annular frame 17, but opposite the travel direction 29. In this way, the air flow imparts a substantial amount of its momentum to the annular frame 17 in the travel direction 41, maximizing the rotating window's rotational speed and mining the amount of air flow required to achieve that speed. In one embodiment of the invention, for example, the rotating viewing assembly 10 is designed so the rotating window 12 rotates at speeds of between approximately 2,000 rpm and 8,000 rpm, and requires an airflow of approximately 30 ft$^3$/hour.

The intermediate portion 49 of each propulsion passage 19 terminates in an air exit region 50 that directs the air flow away from the annular frame 17. In the illustrated embodiment, the air exit region 50 includes an exit aperture 52 which directs the air flow radially outwardly from the propulsion passage 19 into a circumferential channel portion 54. A series of circumferential channel portions 54 are preferably connected end-to-end, as shown in FIGS. 2 and 3 so as to form a single peripheral channel 56 which extends around the entire periphery of the annular frame 17. Spaced around the peripheral channel 56 are exhaust ports 58 extending axially through the annular frame 17. The exhaust ports are shaped to direct the air flow out of the peripheral channel 56 and away from the annular frame.

Although the propulsion passages 19 shown in the figures direct air radially outwardly from the air intake aperture 47 to the exhaust ports 58, thereby using the benefit of centrifugal force. The propulsion passages may also direct the air in the opposite direction or along other paths. In one alternate embodiment, the air intake aperture 47 is positioned radially outward from the exhaust ports 58, so the propulsion passages receive air from an outlet aperture 28 that is positioned radially outward from the propulsion passages 19. Accordingly, the air flows radially inwardly through the propulsion passages, and to exhaust ports 58 located in the annular frame 17. The exhaust ports 58 then direct the flow away from the annular frame 17.

Figure 4:
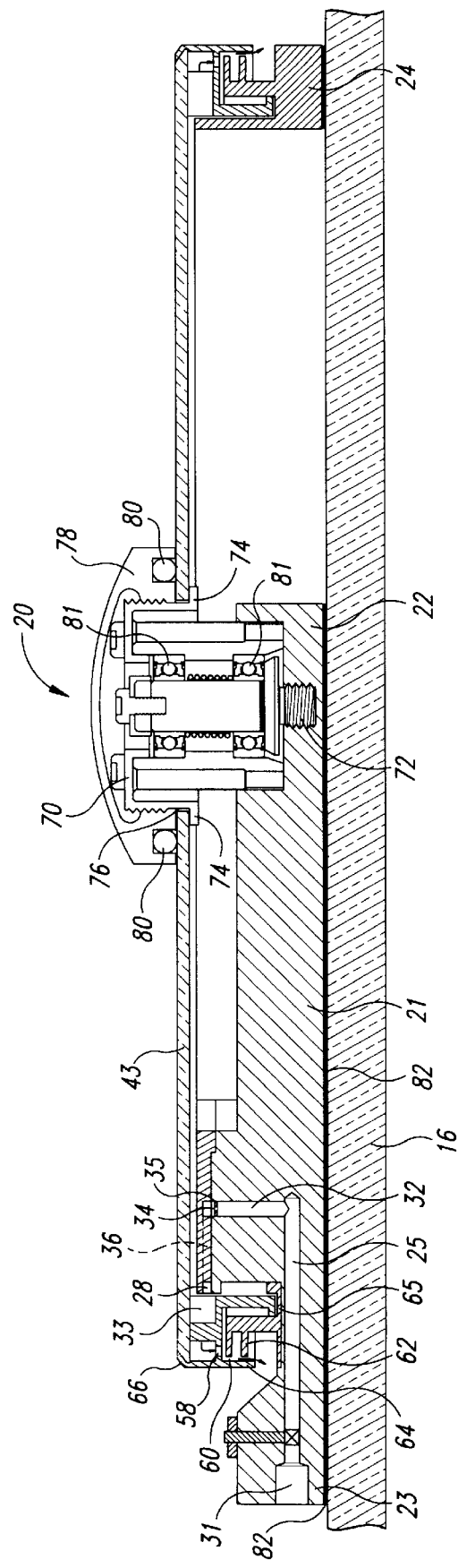
FIG. 4 is an enlarged cross-sectional view taken substantially along line 4—4 of FIG. 2 showing an interconnection of a rotating window, a support base, and a central hub of the present invention.

As best seen in FIG. 4, the exhaust ports 58 of the exemplary embodiment are sized and shaped to direct the air toward the base ring 24 of the support base 14 and away from the annular frame 17. The air passes through the exhaust ports 58 into a gap region 60 which is formed between the annular frame 17 and the base ring 24. The air flows through the gap region 60 and away from the annular frame 17. In the preferred embodiment, the gap region 60 defines a minimal gap between the annular frame 17 and the base ring 24.

The flow of the air into the gap region 60 is such that the flowing air fills the entire gap region around the rotating window 12. Accordingly, the air in the gap region 60 flows substantially uniformly out of the gap region and away from the rotating viewing assembly. This flow of air out of the gap region 60 creates an air barrier that advantageously prevents liquid or solid debris from entering the gap region and contaminating the space between the pane 43 and the stationary window 16 to which the assembly is mounted. This function is particularly important where the rotating window 12 is used in a machining or tooling enclosure where lubricants, chips, and other debris could otherwise easily enter the gap region 60 and cause the annular frame 17 to bind against the base ring 24.

Debris is further prevented from entering the gap region 60 by baffle members or flanges 62 which extend radially outwardly from the base ring 24 into the gap region. In the exemplary embodiment, the annular frame 17 includes a lip 64 that is spaced radially outward of the baffle members 62 and that extends axially toward the base ring 24 in proximity to the baffle members to form a labyrinth seal. The labyrinth seal substantially prevents debris from entering the gap region 60 and interfering with rotation of rotating as window 12 relative to the support base 14. When the rotating viewing assembly is not in use, such that the air barrier is not provided, the baffle members 62 prevent debris from entering the gap region 60. The baffle members 62 therefore provide an important supplemental means by which to prevent debris from entering the gap region 60. If for some reason liquid manages to pass through the gap region 60, a drain hole 65 is provided in the base ring 24 to allow the liquid to drain by gravity away from the base ring and the annular frame 17.

As shown in FIG. 4, the periphery of the annular frame 17 includes a retainer portion 66 that projects away from the base ring 24 and is bent radially inwardly to engage a bevel surface 68 on the outer edge of the pane 43. The retainer portion 66 works in conjunction with the adhesive to tightly secure the pane 43 to the annular frame 17 so that the air passing through the propulsion passages 19 does not leak out between the annular frame and the pane. The retainer portion 66 is sized to be as visually unobtrusive as possible, so as to maximize the area of the pane 43 available for viewing.

The pane 43 and annular frame 17 are together rotatably supported relative to the base ring 24 by the hub assembly 20. The hub assembly 20 includes a hub body 70 attached with a threaded attachment shaft 72 to the hub housing portion 22 of the base-center portion 21. The hub body 70 includes a hub rim 74 which projects underneath an inner portion 76 of the pane 43. A hubcap 78 is threadably attached to the hub body 70 so as to clamp the inner portion 76 of the pane 43 between the hub rim 74 and the hubcap 78. A lower edge of the hubcap 78 includes an O-ring 80 which seals against the pane 43 to prevent debris from entering the hub assembly 20.

Ball bearings 81 in the hub body 70 allow smooth rotational motion of the hubcap 78, pane 43, and hub rim 74 relative to the hub housing 22. In other embodiments, other means are used to provide a low-friction rotational connection between the rotating window 12 and the support base 21.

The support base 14 is affixed to the window 16 by an adhesive pad 82 having substantially the same footprint as the support base. Accordingly, the adhesive pad 82 is sandwiched between the window 16 and the base ring 24 and the base-center portion 21. The preferred adhesive pad 82 is a double-sided adhesive backed tape comprising an acrylic, high adhesion bonding material. A primary advantage of this securing method is that there is no need to cut a hole in the window 16 in order to mount the rotating viewing assembly 10 Thus, the structural integrity of the window 16 remains unchanged. This is particularly important in tooling and machining applications where, for example, milling machines inside the enclosure constantly throw material, such as coolant, oil, chips and fragments of metal, toward the window 16 of the enclosure.

In an alternate embodiment of the invention shown in FIGS. 5A and 5B, the support base 14 is removably attached to a mounting plate 84, which has substantially the same footprint as the support base and is fixedly attached to the window 16 with the adhesive pad 82. The support base 14 is releasably attached to the mounting plate 84 by a plurality of conventional threaded fasteners 86 that extend through the base ring 24 and the base-center portion 21. Accordingly, the rotating viewing assembly 10 can be easily and quickly removed from the mounting plate 84 upon removing the fasteners 86. The removed rotating viewing assembly 10 can then be easily replaced with a new assembly, for example, as the removed assembly undergoes routine maintenance.

As best seen in FIG. 5B, a cover 94 is removably attachable to the mounting plate 84 when the rotating viewing assembly 10 is removed and not immediately replaced by another assembly. The cover 94 protects the window 16 and mounting plate 84 from damage and contamination when the rotatable viewing assembly 10 is removed. In the illustrated embodiment, the cover 94 is attached to the mounting plate 84 with conventional threaded fasteners 86, although other embodiments use other known attachment devices.

An advantage of the removable attachment between the rotatable viewing assembly 10 and the mounting plate 84 is that the rotatable viewing assembly may be easily and quickly removed without having to break an adhesive bond. The removable feature is also advantageous because it permits rotatable viewing assemblies 10 to be stored or to be moved to various mounting plates 84. For example, an enclosure surrounding a machining tool may have several windows 16, only one of which provides an optimal view of the machining operation at any one time. The present invention allows a plurality of relatively inexpensive mounting plates 84 to be positioned on each window 16, and a single rotating viewing assembly 10 may then be mounted to a selected one of the mounting plates 84 on the window that provides the best view of the selected machining operation. When the nature of the machining operation changes such that a different window 16 provides the optimal view, the rotating viewing assembly 10 may be easily moved to the appropriate mounting plate 84.

Furthermore, during times when the window 16 is exposed to harsh conditions, but the services of the rotating viewing assembly 10 are not required, the rotating viewing assembly may be removed and stored in a remote location so as minimize the exposure to the harsh conditions. Upon removal of the rotating window assembly 10, the removable cover 94 is installed on the mounting plate 84 to protect the window 16 and mounting plate from the harsh conditions.

Although the rotating viewing assembly 10 is shown installed on a pre-existing stationary window 16, the viewing assembly may be used in a window assembly that provides a viewing port in a solid, non-transparent material, such as a metal housing containing a machining tool. In such an application, the rotating viewing assembly 10 is secured to a panel of safety glass, which is mounted in an aperture formed in the metal housing. Accordingly, the window assembly creates a viewing space that is enhanced by the rotating viewing assembly 10.

In another installation, the rotating viewing assembly 10 is used on the window of a housing through which a camera or other viewing device positioned inside the housing monitors activity outside of the housing. The environment outside the housing may include adverse conditions such as rain, snow, or chemical contamination. Accordingly, the rotating viewing assembly 10 provides a clear view through the window regardless of the conditions outside of the housing.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. A rotatable viewing assembly connectable to a gas source, comprising:
   a support base;
   a gas delivery member having gas supply passageway, the gas supply passageway having an inlet aperture that is coupleable to the gas source and an outlet aperture sized to direct a selected flow of gas therethrough in a first direction relative to the support base away from the outlet aperture; and
   a viewing screen rotatably connected to the support base and having a center portion, an outer edge portion radially outward from the center portion, and at least one propulsion passage connected to the outer edge portion, the propulsion passage having a gas intake aperture at one end and a gas exit region at an opposing end spaced radially apart from the gas intake aperture, the gas intake aperture being positioned to receive the gas from the outlet aperture of the gas supply passageway when the gas intake aperture is adjacent to the outlet aperture, the gas exit region being positioned to direct the gas out of the propulsion passage in a second direction away from the outer edge portion and at a selected angle relative to the outer edge portion, the propulsion passage redirecting the gas from the first direction to the second direction and generating propulsion forces on the outer edge portion to rotate the viewing screen relative to the support base to sling off any debris contacting the rotating viewing screen.

2. The rotating assembly of claim 1 wherein the support base is mountable to a viewing window.

3. The viewing assembly of claim 1 wherein the support base has an outer ring portion and an inner portion radially inward from the outer ring portion, the inner portion having a hub connected to the center portion of the viewing screen.

4. The viewing assembly of claim 1 wherein the propulsion passage is at least partially defined by a bucket connected to the outer edge portion of the viewing screen.

5. The viewing assembly of claim 1 wherein the propulsion passage has a partially circular portion intermediate the gas intake aperture and the gas exit region.

6. The viewing assembly of claim 1 wherein the gas supply passageway is integrally formed in the support base.

7. The viewing assembly of claim 1 wherein the propulsion passage has a substantially straight portion intermediate the gas intake aperture and the gas exit region.

8. The viewing assembly of claim 1 wherein the gas intake aperture is positioned at an acute angle relative to the outer edge portion.

9. The viewing assembly of claim 1 wherein the gas intake aperture is substantially tangential to the outer edge portion.

10. The viewing assembly of claim 1 wherein the support base has a nozzle plate and the outlet aperture is in the nozzle plate, a portion of the gas supply passageway passing from the outlet aperture through the nozzle plate to the intake aperture and having an entrance portion in the nozzle plate spaced radially apart from the outlet aperture.

11. The viewing assembly of claim 10 wherein the nozzle plate is configured so that the entrance portion is substantially perpendicular to the viewing screen.

12. The viewing assembly of claim 1 wherein the support base has a throttling orifice positioned in the gas supply passageway to throttle the flow of gas.

13. The viewing assembly of claim 1 wherein the outer edge portion of the viewing screen has a lip positioned radially outward from a portion of the support base to form a peripheral gap therebetween and one of the support base and the lip has at least one baffle member projecting into the gap to form a debris barrier.

14. The viewing assembly of claim 1 wherein the outer edge portion has a lip positioned radially outward from a portion of the support base to form a peripheral gap therebetween and the gas exit region is positioned to direct the gas into the gap so as to create a gas barrier in the gap to substantially prevent debris from entering the gap.

15. The viewing assembly of claim 1 wherein the outer edge portion has a lip positioned radially outward from a portion of the support base to form a peripheral gap therebetween and the gas exit region includes an exit aperture, a circumferential channel connected at a first portion to the exit aperture and configured to receive the gas from the exit aperture, and an exhaust port connected to a second portion of the circumferential channel and positioned to receive the gas from the circumferential channel through the second portion and direct the gas into the gap so as to create a gas barrier in the gap.

16. The viewing assembly of claim 1 wherein the propulsion passage is a first propulsion passage, further comprising a plurality of propulsion passages, each propulsion passage having a gas intake aperture and a gas exit region spaced radially apart from the intake aperture, each gas intake aperture being positioned to receive the gas moving in the first direction from the outlet aperture of the gas supply passageway when each gas intake is adjacent to the outlet aperture.

17. The viewing assembly of claim 16 wherein the plurality of propulsion passages are substantially coplanar.

18. The viewing assembly of claim 1 wherein the viewing screen comprises:
   a rim having a first surface proximate to the support base and a second surface opposite the first surface, the propulsion passage being formed in the rim; and
   a substantially transparent pane member securely retained on the rim and positioned adjacent the second surface.

19. The viewing assembly of claim 18 wherein the propulsion passage is a groove formed in the second surface of the rim and the pane member defines a portion of the propulsion passage.

20. The viewing assembly of claim 1 wherein the viewing screen has an annular frame portion defining a first plane, the propulsion passage being substantially in the first plane so that the first direction and the second direction are substantially in the first plane, the viewing screen having a substantially transparent pane portion attached to the annular frame portion defining a second plane substantially parallel to the first plane.

21. A rotatable viewing assembly positionable adjacent to a viewing window, comprising:
   a mounting plate;
   a support base having a central axis and being removably attached to the mounting plate with the mounting plate being positioned between the viewing window and the support base;

a window assembly having a rotatable window, and being rotatably mounted to the base plate and being rotatable at a selected rotational speed relative to the support base to move debris contacting the rotatable window off the rotatable window by centrifugal force; and a drive mechanism coupled to the window assembly to rotate the window assembly relative to the support base.

22. The rotatable viewing assembly of claim 21 wherein the drive mechanism is pressurized gas and the window assembly is adapted to be driven by a flow of the pressurized gas.

23. The rotatable viewing assembly of claim 21, further comprising a cover removably attachable to the mounting plate when the base support is removed from the mounting plate.

24. The rotatable viewing assembly of claim 21 wherein the mounting plate having an adhesive pad thereon that is fixedly attachable to a selected viewing window.

25. The rotatable viewing window of claim 21 wherein the support base is removably attachable to the mounting plate with threaded fasteners.

26. A viewing assembly connectable to a gas source, comprising:

a support window having a substantially transparent portion;

a support assembly mounted on the support window;

a gas delivery member having gas supply passageway connected to the support assembly, the gas supply passageway having an inlet aperture that is coupleable to the gas source and an outlet aperture sized to direct a selected flow of gas therethrough in a first direction away from the outlet aperture; and a viewing screen rotatably mounted to the support assembly and having a substantially transparent viewing portion aligned with the transparent portion of the support window, a center portion, an outer edge portion radially outward from the center portion, and at least one propulsion passage connected to the outer edge portion, the propulsion passage having a gas intake aperture at one end and a gas exit region at an opposing end that is spaced radially apart from the gas intake aperture, the gas intake aperture being positioned to receive the flow of gas from the outlet aperture of the gas supply passageway when the gas intake aperture is adjacent to the outlet aperture, the gas exit region being positioned to direct the flow of gas out of the propulsion passage in a second direction away from the outer edge portion and at a selected angle relative to the outer edge portion, the propulsion passage redirecting the flow of gas from the first direction to the second direction and generating propulsion forces on the outer edge portion to rotate the viewing screen relative to the support assembly to sling off any debris contacting the rotating viewing screen.

27. The viewing assembly of claim 26 wherein the support assembly comprises a mounting plate attached to the substantially transparent portion of the support window and a support base, the viewing screen being rotatably mounted to the support base.

28. The viewing assembly of claim 26 wherein the gas supply passageway is integrally formed in the support assembly.

\* \* \* \* \*